United States Patent
De Perthuis et al.

(10) Patent No.: US 7,110,567 B2
(45) Date of Patent: Sep. 19, 2006

(54) OPTIMIZED DETECTION OF A WATERMARK IN AN INFORMATION SIGNAL

(75) Inventors: Hugues De Perthuis, Garcelles (FR); Eric Desmicht, Caen (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 814 days.

(21) Appl. No.: 10/321,199

(22) Filed: Dec. 17, 2002

(65) Prior Publication Data

US 2003/0128403 A1 Jul. 10, 2003

(30) Foreign Application Priority Data

Dec. 20, 2001 (FR) .................................. 01 16576

(51) Int. Cl.
*G06K 9/00* (2006.01)
(52) U.S. Cl. .................. 382/100; 382/280; 708/403; 713/176
(58) Field of Classification Search ................ 382/100, 382/168, 172, 233, 234, 235, 236, 237, 243–246, 382/248–250, 274, 280, 305; 708/403; 713/176; 380/43, 201

See application file for complete search history.

(56) References Cited

U.S. PATENT DOCUMENTS

| | | | |
|---|---|---|---|
| 6,282,300 B1 * | 8/2001 | Bloom et al. | 382/100 |
| 6,614,914 B1 * | 9/2003 | Rhoads et al. | 382/100 |
| 6,826,290 B1 * | 11/2004 | Murakami et al. | 382/100 |
| 6,865,589 B1 * | 3/2005 | Haitsma et al. | 708/403 |
| 6,901,514 B1 * | 5/2005 | Iu et al. | 713/176 |
| 6,993,148 B1 * | 1/2006 | Miyashita et al. | 382/100 |
| 6,993,154 B1 * | 1/2006 | Brunk | 382/100 |
| 7,020,349 B1 * | 3/2006 | Brunk | 382/289 |

FOREIGN PATENT DOCUMENTS

WO     WO 99/45706     * 9/1999
WO     WO9945706       9/1999

* cited by examiner

*Primary Examiner*—Jingge Wu
*Assistant Examiner*—Seyed Azarian

(57) ABSTRACT

The invention relates to a method of detecting a watermark W, formed by a set of coefficients, in an information signal S, said watermark W and said information signal S being configured in the form of matrices SM M*M. The coefficients of the Fourier transform matrix of the matrix of the signal TSM and the coefficients of the Fourier transform matrix of the watermark matrix TWM are used in a calculation step CAL of the inverse transform matrix of the multiplication ITM of the transform matrix of the signal TSM and of the transform matrix of the watermark TWM, said calculation CAL being produced in sequences which each result in obtaining I columns of the inverse transform matrix of the multiplication, where M is a multiple of I and different from I. Said I columns are stored in a memory called internal memory and the detection step DET of the watermark is achieved with each sequence by detection of peaks of each set of the I columns while said I columns are present in the internal memory. The invention permits the use of a small-size internal memory.

10 Claims, 3 Drawing Sheets

OPTIMIZED DETECTION OF A WATERMARK IN AN INFORMATION SIGNAL

Figure 1:
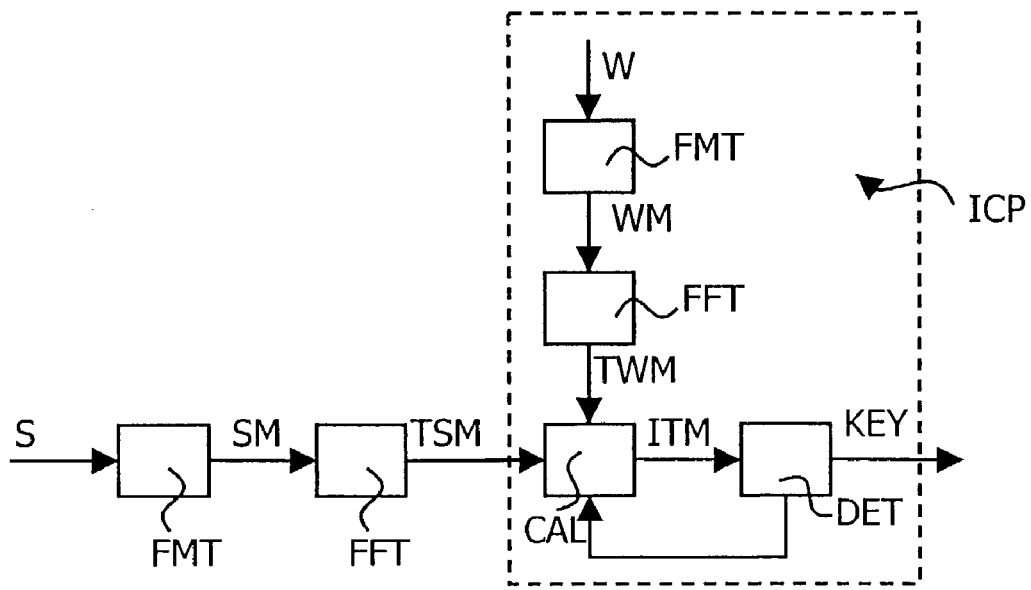

The invention relates to a method of detecting a watermark in the form of a set of coefficients in an information signal, the method including the steps of:
configuring, intended to configure said watermark in the form of a matrix of size M*M, and said information signal in the form of at least one matrix of size M*M,
calculating the coefficients of the Fourier transform matrix of the signal matrix,
calculating the coefficients of the Fourier transform matrix of the watermark matrix,
calculating the inverse transform matrix of the multiplication of the transform matrix of the signal and the transform matrix of the watermark,
detecting the watermark by detection of peaks in the coefficients of the inverse transform matrix of the multiplication.

The invention also relates to an integrated circuit including means for executing the steps of the method according to the invention and an apparatus for processing information signals, which apparatus may be, for example, a digital video signal decoder.

Such a method is known, for example, from document WO99/45706 whose description mentions the use of a correlation calculation of the signal with the watermark, said signal and said watermark being presented in the form of matrices of size 128*128. This correlation calculation is made in various steps such as described above. The calculation step of the inverse transform matrix of the multiplication of the transform matrix of the signal and the transform matrix of the watermark is carried out in two sub-steps, a first sub-step calculates the multiplication of the signal with the conjugate of the watermark, a second sub-step calculates the inverse transform. To calculate the inverse transform in this way, the coefficients of all the rows and all the columns of the matrix resulting from the multiplication are to be available at the start of the calculation step of the inverse transform. This makes it necessary for the matrix resulting from the multiplication to be stored in a memory so as to be available during the calculation of the inverse transform. The memory is thus to have a larger size than that of the matrices it is intended to store, or to have the same size.

The invention is linked with the following considerations: Watermarking of information signals is particularly intended to avoid copies of these information signals, to authenticate these signals . . . . These functions make it necessary for the watermarking generally affixed in the form of a watermark, for example constituted by pseudo-random points, to remain secret and not to be isolated. Actually, if this were the case, the isolated watermark could be removed, affixed to wrong signals . . . . Here the necessity will be understood to secure the access to characteristics of the watermarking. This amounts to not letting data whose watermark characteristics can be inferred, dwell in portions of the circuit where they could be read.

In the state of the art a 128*128 memory is necessary for storing the result of the multiplication of the Fourier transform matrix of the signal and the transform matrix of the watermark. Such a memory has a considerable size. For example, for 128*128 matrices, the size is of the order of 2 mm$^2$ in current technology (or 0.18 µm). A first manufacturing option is to include this memory in the portion of the circuit or in the hardware circuit that comprises the resources for carrying out the other operations where the characteristics of the watermarking are used. This implies that said circuit or hardware circuit portion has a considerable size.

Another option is to make an encoding on the fly and utilize a memory outside the circuit portion where the watermark detection is performed to store the coefficients of the intermediate calculation matrices. This presents disadvantages from the point of view of security, because the data can be read during the accesses to the external memory. It is an object of the invention to resolve the problems met in these two options, that is to say, to avoid a memory of considerable size to be incorporated with the hardware circuit which performs watermark detection operations and to avoid calls to external resources of this circuit.

Actually, a method according to the opening paragraph is characterized according to the invention in that the calculation step of the inverse transform matrix of the multiplication is carried out in sequences which each result in obtaining I columns of the inverse transform matrix of the multiplication, M being a multiple of I and different from I, said I columns being stored in a memory called internal memory, and in that the detection step of the watermark is carried out with each sequence by a detection of peaks in each set of the I columns, while said I columns are present in the internal memory. The calculation of the inverse transform matrix in sequences of I columns, where I is less than M, permits to utilize only a memory of a size smaller than M*N but at least of size I*M. The use of such a reduced-size memory permits this memory to be easily inserted in the hardware circuit portion that performs the operations using watermark coefficients.

In a preferred embodiment the configuration step intended to configure said watermark in the form of matrix of size M*M, the calculation step of the coefficients of the Fourier transform matrix of the watermark matrix, the calculation step of the inverse transform of the multiplication and the step of detecting the watermark, are carried out inside a same circuit portion called internal portion which includes the internal memory and storage means for storing the coefficients of the watermark as well as the matrices resulting from the configuration step and calculation step of the coefficients of the Fourier transform matrix of the watermark matrix.

It will be understood that such a calculation requires to fetch for each sequence the coefficients of the Fourier transform matrix of the signal and of the Fourier transform matrix of the watermark. The coefficients of the Fourier transform matrix of the watermark are stored in general in the internal portion of the hardware circuit and are easily accessible. On the other hand, still to avoid the presence of large quantities of memories in the internal portion, the coefficients of the Fourier transform matrix of the signal are stored outside the internal portion, for example, in an SDRAM memory, from which they are fetched as required. Thus, a secondary problem occurs which is the limitation of the passband of access to the external memory for the internal portion of the circuit.

In an advantageous embodiment the number of columns I is calculated to achieve a compromise between the passband of access to a memory called external memory in which the coefficients of the Fourier transform matrix of the signal matrix and the capacity of the internal memory are stored.

Indeed, in this case a compromise is actually achieved between the size of the internal memory which may be at least I*M and the passband of access to the external memory.

The invention further relates to a particular implementation of the principle according to the invention which gives a detailed version of the joint calculation of the multiplication and the inverse Fourier transform.

The invention may particularly be implemented in an integrated circuit intended for the detection of a watermark in an information signal.

More generally, the present invention may advantageously be implemented in any information signal processing apparatus which may be, for example, a digital video signal decoder.

These and other aspects of the invention are apparent from and will be elucidated, by way of non-limitative example, with reference to the embodiments described hereinafter.

Figure 2:
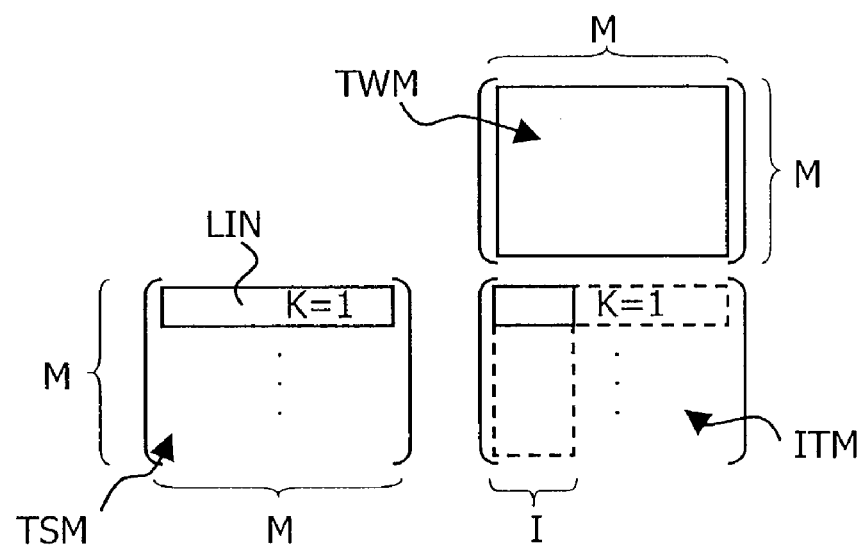
Figure 3:
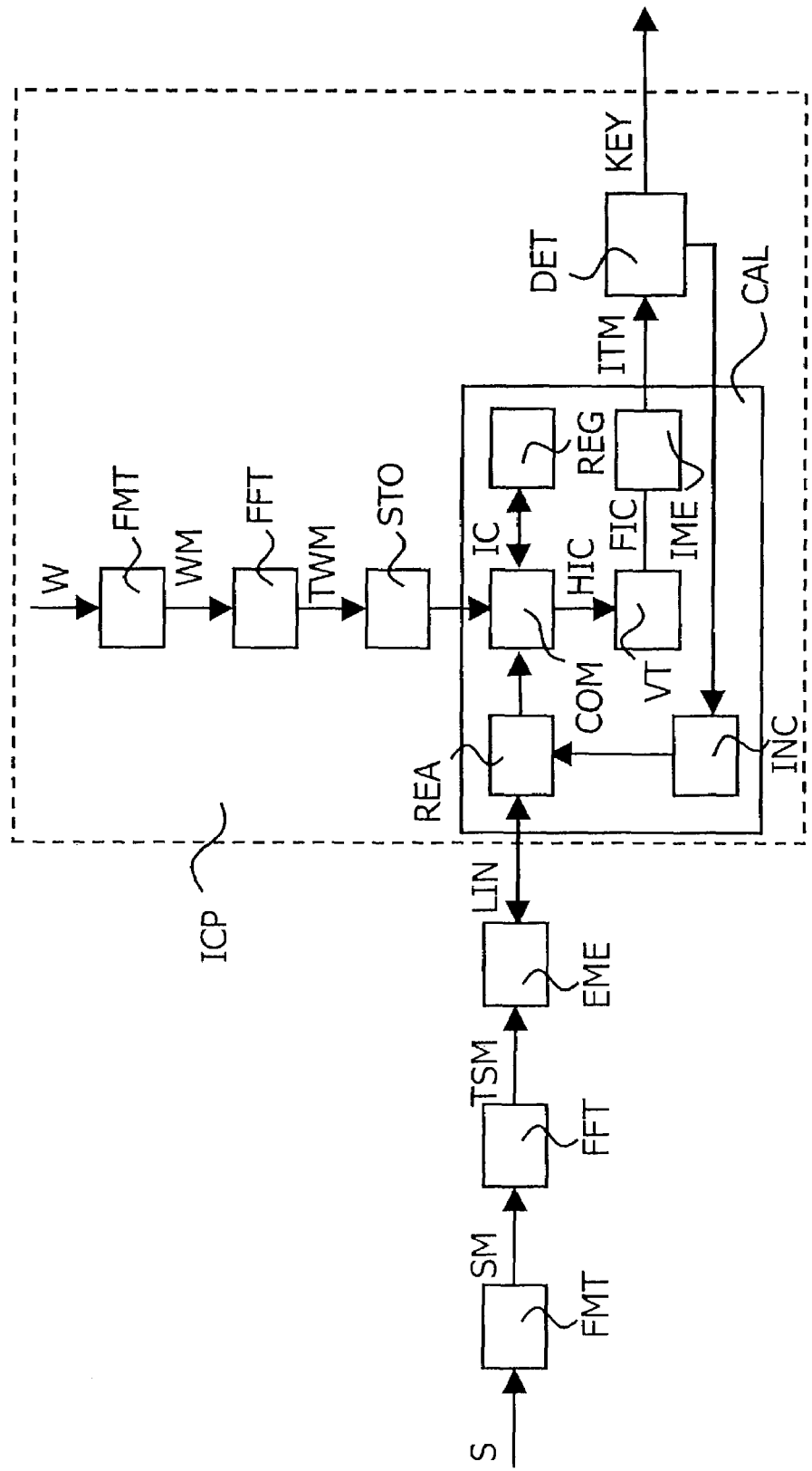
Figure 4:
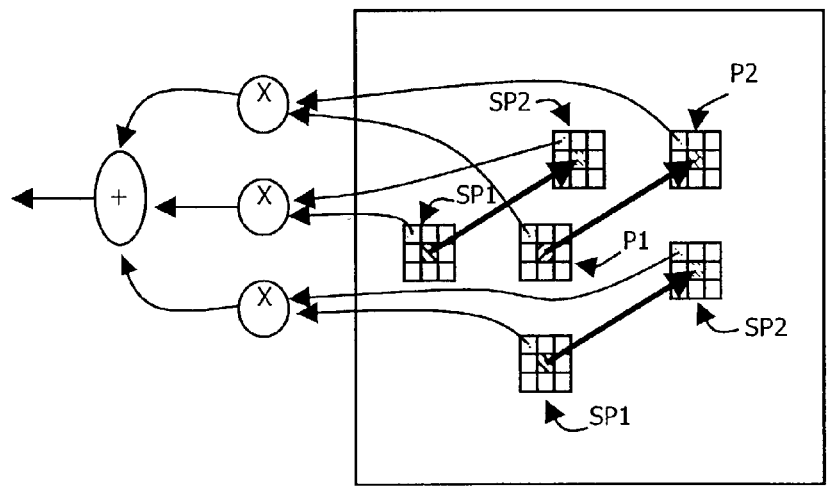
Figure 5:
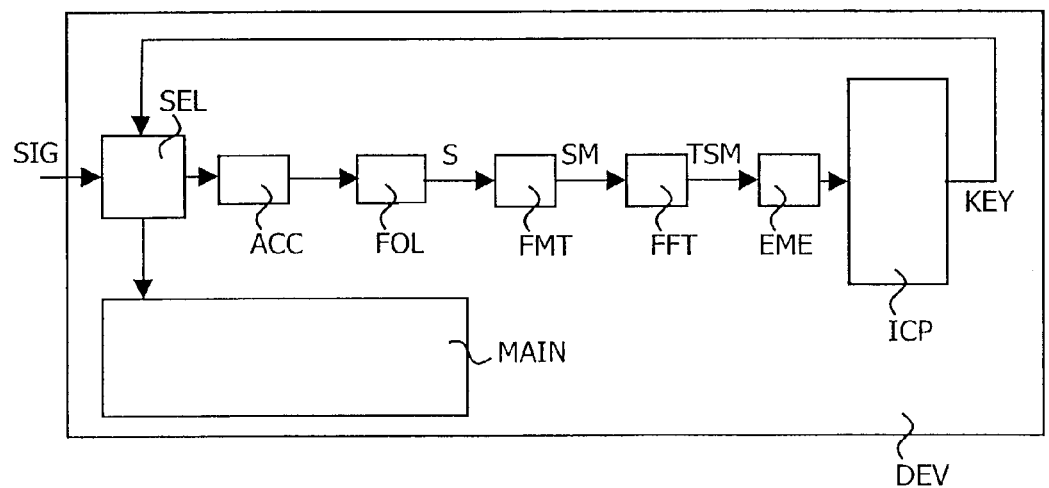

In the drawings:

FIG. 1 is a schematic diagram of a watermark detection method according to the invention, FIG. 2 illustrates the operation of the invention according to a particular embodiment of the invention, FIG. 3 is a schematic diagram of an integrated circuit according to the invention, FIG. 4 illustrates a peak search carried out by using a method according to the invention, FIG. 5 illustrates an information signal processing apparatus according to the invention.

The following description is given to permit a man of skill in the art to implement and utilize the invention. This description is given in the context of the patent application and its requirements. Various alternatives of the preferred embodiment will be evident to the man of skill in the art and the generic principles of the invention which are described here may be applied to other embodiments.

Thus, the present invention is not deemed to be limited to the embodiment described but rather to have the largest scope in keeping with the principles and characteristics described hereinafter.

FIG. 1 is a schematic diagram of a method according to the invention. A plurality of watermark detection methods in, for example, digital video data are known. These methods utilize various perfectionings based on the same principle: the calculation of a correlation between a watermark including a set of coefficients and the information signal. For example, in the case of a video image, the watermark can be represented in the calculations by a two-dimensional matrix which represents a noise. The invention relates to such watermarks as can be expressed in the form of a matrix of size M*M with M being an integer greater than or equal to 1. Moreover, it is also necessary for various reasons running from the signal quality to security that the watermark is not visible in the signal. The watermark will thus be similar to imperceptible noise added to the information signal. A watermark according to the invention may comprise invisible tags attached to a content which may be an audio content, video or multimedia or any other content to which noise can be added.

The watermark of information signals is particularly intended to avoid copies of these information signals, to authenticate these signals . . . . These functions make it necessary for the watermarking generally affixed in the form of a watermark, for example, constituted by pseudo-random points, to remain secret and not be isolated. Actually, if this were the case, the isolated watermark could be removed or also affixed to wrong signals . . . . It will be understood in this context that it is necessary to secure the access to characteristics of the watermark. This amounts to not leaving data whose watermark characteristics can be deduced so as to dwell in portions of the circuit where they could be read. It is remarkable to observe for that matter that other protection functions of the data present in an information signal may be performed via such a watermark. For example, it is possible to permit a first copy of the signal, while said copy leads to affixing a second, different, watermark or the same watermark shifted in a direction of a given distance. The latter use of several watermarks, possibly shifted over the signal is particularly interesting because they are very hard to remove. Moreover, the choice of the distance between two watermarks allows to give varied meanings and functions to the final watermark of the image, which meaning and functions for example relate to the security as described earlier.

The method of detecting a watermark W formed by a set of coefficients in an information signal S includes according to FIG. 1 a configuration step FMT intended to configure said watermark W in the form of a matrix WM of size M*M, and said information signal S in the form of at least a matrix SM of size M*M, a calculation step FFT for the coefficients of the Fourier transform matrix TSM of the signal matrix SM, a calculation step FFT for the coefficients of the Fourier transform matrix TWM of the watermark matrix WM, a calculation step CAL for the inverse transform matrix ITM of the multiplication of the transform matrix of the signal TSM and of the transpose of the conjugate transform matrix of the watermark TWM, a detection step DET of the watermark by detection of peaks in the coefficients of the inverse transform matrix ITM of the multiplication. It is important to note here that the configuration step and calculation step for the Fourier transform for finally utilizing the watermark in its expression of frequency may be carried out before the method is implemented, the result of these steps then being directly stored in the form of a matrix in the frequency domain. This does not alter the scope of the invention in the sense where in any way the presence of a watermark in its frequency form has made it necessary to calculate and configure it in the form of a matrix. The result KEY informs other functions outside the method of watermark detection of the presence or absence of the watermark and its meaning and/or its function. The detection method may be implemented with various options or perfectionings known from the state of the art. For example, the information signal in which the watermark is detected may be the result of an accumulation of a series of information signals received during a given period. An average over a certain time of the signal is then obtained. This is possible when the information signal is, for example, a sequence of video images. The Fourier transform step may also be simplified, for example, by a calculation according to the butterfly technique. As the watermark is identical from one image to the next, the accumulation of images makes it possible to take out the watermark in an average image formed from various images whose differences are averaged and where, on the other hand, the watermark is accumulated. A step of normalizing amplitudes of the information signal may be carried out on the information signal prior to the multiplication step so as to obtain a signal cleared from its mean value and to better bring out again the possible peaks of the watermark. These techniques are known from the document of the state of the art and will not be described in more detail in this text. In the case where the information signal is normalized, this is called "SPOMF" whose principle amounts to considering that the phase coefficients carry the information that is necessary and sufficient for the detection of the watermark, while the average norm of the signal is subtracted (SPOMF: Symmetrical Phase Only Matched Filtering).

The invention relates to the calculation step CAL and detection step DET. Actually, according to the invention and with reference to FIG. 2 the calculation step CAL of the inverse transform matrix ITM of the multiplication of the transform matrix of the signal TSM and of the transpose of the conjugate transform matrix of the watermark TWM is calculated in sequences which each result in obtaining I columns of the inverse transform matrix ITM of the multiplication, where M is a multiple of I and different from I, said I columns being stored in a memory called internal memory and the detection step DET of the watermark is carried out in each sequence by detecting peaks for each set of the I columns while said I columns are present in the internal memory.

According to the invention the coefficients of all the rows and columns of the matrix resulting from the multiplication are not available at the same time. The calculation of the inverse transform matrix in sequences of I columns, where I is less than M, permits to utilize only a memory (generally SRAM) of smaller size than M*M but of size I*M as a minimum. The use of such a small-size memory allows to easily insert it in the hardware circuit portion that comprises the resources for carrying out the other operations where the characteristics of the watermark are used. This permits both not to have to utilize a large memory in this circuit portion and, as said circuit does not have contact with the exterior for memory calls during the calculations relating to the detection of the watermark, this also permits to obtain a secured assembly.

Thus, in an illustrated preferred embodiment notably in the integrated circuit diagrammatically shown in FIG. 3, the configuration step FMT intended for configuring said watermark W in the form of a matrix WM of size N*M, the calculation step FFT of the Fourier transform matrix TWM of the watermark matrix WM, the calculation step CAL of the inverse transform of the multiplication and the detection step DET of the watermark are provided in the same circuit portion called internal circuit portion ICP including the internal memory IME, the means for carrying out the steps mentioned previously and storage means STO for storing the coefficients of the watermark W as well as the matrices WM resulting from the configuration step FMT and calculation step FFT of the coefficients of the Fourier transform matrix TWM of the watermark matrix. It is thus observed that the internal circuit portion ICP is isolated from external resources. Implemented in semiconductor hardware technology this embodiment permits to protect any access to the characteristics of the watermark, that is to say, notably to these coefficients.

While reference is made, for example, to FIG. 2, it will be seen that the calculation in sequences according to the invention requires to fetch for each sequence the coefficients of the Fourier transform matrix of the signal TSM and of the Fourier transform matrix of the watermark TWM. The coefficients of the Fourier transform matrix of the watermark TWM are generally stored in the hardware internal circuit portion ICP and are easily accessible for the calculation functions that are appropriate for the detection of the watermark. On the other hand, still for avoiding the presence of large quantities of memory in the internal circuit portion ICP, the coefficients of the Fourier transform matrix of the signal are stored outside the internal portion in an external memory EME, for example, a SRAM memory, from which they are fetched as required. Effectively, these coefficients need not remain secret. Thus a second problem appears which is the limitation of the passband of access to the external memory EME for the internal circuit portion ICP.

In an advantageous embodiment the number of columns I is calculated for reaching a compromise between a passband of access to a memory called external memory in which the coefficients of the Fourier transform matrix of the signal matrix and the capacity of the internal memory are stored.

Indeed, in this case a compromise is actually reached between the size of the internal memory which may be at least 1*M and the passband of access to the external memory. For example, in one embodiment the matrices on which the various operations are carried out are 128*128 in size. Without the invention the size of the memory to be incorporated with the internal circuit portion is about 2 mm$^2$ in current technology. According to the invention, if one column at a time is calculated, there will have to be 128 times more memory accesses for obtaining a total result of the detection of the watermark than if the internal memory contained the result matrix of the multiplication ITM in all. If four columns are calculated at a time, four times fewer accesses are required than with a calculation in sequences of a column for a memory having a size sixteen times smaller than that necessary for storing the whole matrix. Here the net interest of the invention even in the case where the passband compared to the external memory is small enough will be understood.

Now will be described in more detail a particular embodiment of the principle according to the invention in that details are given of the joint calculation of the multiplication and the inverse Fourier transform. FIG. 2 is in this respect indicative of a special embodiment. Actually, it is described that the calculations are made to obtain a set of I columns for clarity but it is also possible for the calculations to be carried out to obtain a set of rows without, however, excluding the principle of the invention.

FIG. 2 diagrammatically illustrates how the coefficients of the inverse transform matrix ITM are obtained. FIG. 3, representing an integrated circuit according to the invention, presents an internal circuit portion ICP which has means for carrying out the calculations relating to the detection of the watermark according to the particular embodiment referred to in FIG. 2. The following description thus relates to these two Figures. The transform matrix of the signal TSM is stored, for example, in the external memory EME. This matrix is read by the internal circuit portion ICP and more particularly by calculation means CAL of the inverse transform of the multiplication which includes reading means REA for reading row LIN by row LIN, said rows being numbered K with K running from 1 to M, coefficients of the transform matrix of the signal TSM via access to the external memory EME where they have been stored. It should be noted that in the case where the coefficients show a symmetry in the matrix, it may be possible that only half of the coefficients are read and that, for example, the sign of the argument is changed to make the calculations for the other half of the coefficients. This permits to release the passband. Combining means COM of the calculations of the multiplication and of the inverse transform of the multiplication receive, on the one hand, the row K of the matrix TSM and the coefficients of the matrix TWM stored in the storage means STO. Thus a combination of the multiplication of row K written in the external memory EME and the transform matrix of the watermark TWM is made with the calculation of a number I included between one and M/2, coefficients HIC of the horizontal inverse transform of the row K, said combination sequentially being made with all the rows LIN to obtain with each sequence for which the rows LIN are all read, an assembly of I columns of coefficients HIC which is the result of the horizontal inverse transform of the multiplication of the two matrices. The calculation is thus made in two times. First the "conventional" multiplication for each of the coefficients and horizontal Fourier transform immediately after that, based on a temporary calculation of the coefficients of the row of the matrix ITM corresponding to the extracted row of the matrix TSM. For each row the calculation of the I coefficients of the horizontal transform makes it necessary to have calculated all the coefficients of the first row of ITM. At least a number of registers REG equal to the number of columns of each sequence is thus necessary for the invention to permit at least part of the necessary intermediate coefficients IC of the row to be maintained, the calculation time for the coefficients HIC of the horizontal inverse transform. Actually these registers are then accumulators in which the sum of the coefficients which are the result of the multiplication of the two matrices situated on the row K corresponding to the extracted row K of the transform matrix of the signal are added together, said coefficients each being multiplied by a complex factor that corresponds to the expression of the inverse transform before being added to the register. This complex factor has the form exp(-i2.pi.K.n/128) in the case of 128*128 matrices, K being the number of the row and n the number of the sample on the row K. Thus, for example, for the whole 128*128 matrix (i.e. for all the sequences) while utilizing sequences for which I=1, 128*128*128 operations will be necessary to carry out the calculation of the correlation and then 128*128*128 operations for the calculation of the horizontal inverse transform if these two operations are carried out separately, or 128*128*128 in all if the calculation of the correlation and that of the inverse transform are carried out one after the other. As regards the access to the external memory, it is necessary to read the matrix TSM 128 times, which amounts to making 128*128*128 accesses.

Once the I columns of coefficients of the sequence, which result from the inverse Fourier transform HIC, are obtained, the calculation of the vertical transform is carried out with all the coefficients that are the result of the horizontal inverse transform of the column by calculation means of the vertical transform VT. It is useful to note here that only the calculation of the vertical inverse transform may be optimized by usual calculation reduction methods used for the signal processing, for example the butterfly technique. In this case with so-called butterfly calculations 7*128*128 operations will be carried out to calculate the vertical inverse transform over the whole matrix, that is to say, for all the sequences. If not, again 128*128*128 operations will be necessary for calculating the vertical inverse transform. Actually, the calculation of the vertical inverse transform is carried out while all the coefficients of the column are available, whereas for the calculation of the horizontal transform not all the coefficients are available and the calculation according to the butterfly technique cannot be carried out. The calculation of the vertical transform thus produces the final coefficients FIC of the matrix ITM which are stored in the internal memory IME. These final coefficients FIC are used in detection means DET where for each sequence the I columns are analyzed to find the maximum and maintain it in general in a register or in the internal memory if its value is higher than the value present in the register. The contents of said register are thus modified during the sequences so as to have there always the maximum value of the matrix. Thus the maximum peak P1 is detected in the matrix. Its value is also stored to notably be able to correlate this value with that of peaks found afterwards. The peak detection techniques are well known from the state of the art.

As regards the detection of secondary peaks and while reference is made to FIG. 4, the zone of 8 pixels surrounding the first peak is disregarded for the search for the second peak. Also an exclusion zone around the first peak where the second peak will not to be sought is defined. For example, in FIG. 4 this zone is the cross defined by the horizontal and vertical projections of the zone of 8 pixels surrounding the first peak. It is then advantageous to put the detection of the second peak and of various sub-peaks together, for example, two in the Figure but advantageously a larger number (sixteen for example), in that as many registers are used for storing them. It is also useful to have positions and values of various sub-peaks SP1 situated in the exclusion zone to establish the correlations of these sub-peaks SP1 with the similar sub-peaks SP2 of the second peak P2. The search for the peak P2 amounts to correlating each of the 16 sub-peaks found outside the exclusion zone with the first peak, the second peak being that for which there is maximum correlation. For this search step for the second peak and sub-peaks, as many operations and memory accesses as before will be necessary if no optimization is made because the matrix TSM is still to be fetched an important number of times.

In FIG. 4, for searching for the second peak and sub-peaks, the sub-peaks are sought outside the zone around the first peak, they thus fill up 3 memory spaces or registers after which the search is then carried out in the exclusion zone and the sub-peaks found are also stored in the memory. Then, the first peak is correlated with each of the sub-peaks present outside the exclusion zone, the best being identified as the second peak. Then the sub-peaks are correlated with the peak corresponding to them, that is to say, for which a shift which is equivalent to that found between the first and second peaks has been applied, as indicated by the thin arrows. In FIG. 4 the correlation is established in a 3*3 zone for simplicity of illustration but it is advantageous to make the correlation of 9*9 zones. For working with 16 sub-peaks, the internal memory is to have 2*16 memory locations for accumulated correlation and for the temporary results of the inverse transform.

More generally, the present invention may advantageously be implemented in any device for processing information signals, which may be, for example, a digital video signal decoder.

The invention thus also relates to an information signal processing device DEV which may be, for example, a digital video signal decoder. Such a device DEV is described in FIG. 5. This device receives information signals SIG which are intended to be used for a main function MAIN of the device DEV. This main function may be, for example, the display of a video content, the information signal coming from this video content. The device DEV includes means SEL for influencing the supply of information signals to the main function MAIN. These means are guided by the result KEY of a watermark detection according to the invention. This result KEY is called key and it gives a meaning to the position of the first and the second peak as well as the distance between them. This detection is made in an internal portion of the circuit ICP as described previously. The device may advantageously further include accumulation means ACC for calculating a mean value from various information signals so as to make the watermark come out better, which watermark is identical for each of the signals which are different from each other. Data preparation means FOL transform the rough signal into data which can be used in our method. For example, via the folding technique the rough signals are divided into matrices M*M, the matrices are added together during a given time period, each pixel of a first matrix is added together with its corresponding pixel in a second matrix. Various matrices M*M are then processed in the method according to the invention for detecting the watermark. Then, the signal is configured by means FMT after which a Fourier transform is applied thereto, the result being stored in a memory called external memory EME before being used within the internal circuit portion ICP.

Although this invention has been described in keeping with the embodiments shown, a man of skill in the art will immediately recognize that there are variants of the embodiments shown and that these variants remain within the spirit and scope of the present invention. Thus, numerous modifications may be introduced by a man of skill in the art without, however, leaving the spirit and scope defined by the following claims.

The invention claimed is:

1. A method of detecting a watermark in the form of a set of coefficients in an information signal, the method including the steps of:
   configuring, intended to configure said watermark in the form of a matrix of size M*M, and said information signal in the form of at least one matrix of size M*M,
   calculating the coefficients of the Fourier transform matrix of the signal matrix,
   calculating the coefficients of the Fourier transform matrix of the watermark matrix,
   calculating the inverse transform matrix of the multiplication of the transform matrix of the signal and the transform matrix of the watermark,
   detecting the watermark by detection of peaks in the coefficients of the inverse transform matrix of the multiplication,
characterized in that the calculation step of the inverse transform matrix of the multiplication is carried out in sequences which each result in obtaining I columns of the inverse transform matrix of the multiplication, M being a multiple of I and different from I, said I columns being stored in a memory called internal memory, and in that the detection step of the watermark is carried out with each sequence by a detection of peaks in each set of the I columns, white said I columns are present in the internal memory.

2. A method as claimed in claim 1, characterized in that the configuration step intended to configure said watermark in the form of a matrix of size M*M, the calculation step of the coefficients of the Fourier transform matrix of the watermark matrix, the calculation step of the inverse transform of the multiplication and the step of detecting the watermark, are carried out inside a same circuit portion called internal portion which includes the internal memory and storage means for storing the coefficients of the watermark as well as the matrices resulting from the configuration step and calculation step of the coefficients of the Fourier transform matrix of the watermark matrix.

3. A method as claimed in claim 1, characterized in that the number of columns I is calculated to achieve a compromise between the passband of access to a memory called external memory in which the coefficients of the Fourier transform matrix of the signal matrix and the capacity of the internal memory are stored.

4. A method as claimed in claim 1, characterized in that each sequence of the calculation step of the inverse transform of the multiplication includes the following sub-steps of:
   reading the coefficients of the transform matrix of the signal row by row via access to a memory called external memory where they have been stored,
   combining the multiplication of the row read from the external memory and of the transform matrix of the watermark with the calculation of a number I, included between one and M/2, of the coefficients of the horizontal inverse transform of the row, said combination being carried out sequentially over all the rows to obtain with each sequence a set of I coefficient columns which is the result of the horizontal inverse transform of the multiplication of the two matrices,
   calculating with each sequence the vertical inverse Fourier transform of the M coefficients present in the I coefficient columns which is the result of the horizontal inverse transform.

5. An integrated circuit intended for the detection of a watermark which comprises a set of coefficients in an information signal, the integrated circuit including means for:
   configuring said watermark in the form of a matrix of size M*M and said information signal in the form of at least one matrix of size M*M,
   calculating the coefficients of the Fourier transform matrix of the signal matrix,
   calculating the coefficients of the Fourier transform matrix of the watermark matrix,
   calculating the inverse transform matrix of the multiplication of the transform matrix of the signal and of the transform matrix of the watermark,
   detecting the watermark by detecting peaks in the coefficients of the inverse transform matrix of the multiplication,
characterized in that the calculation means for calculating the inverse transform matrix of the multiplication operate in sequences which each result in obtaining I columns of the inverse transform matrix of the multiplication, where M is a multiple of I and different from I, said I columns being stored in a memory called internal memory and in that the watermark detection means utilize for each sequence a detection of peaks for each set of the I columns while said I columns are present in the internal memory.

6. A circuit as claimed in claim 5, characterized in that the number of columns I is calculated for realizing a compromise between the passband of access to a memory called external memory in which the coefficients of the Fourier transform matrix of the signal are stored and the capacity of the internal memory.

7. A circuit as claimed in claim 5, characterized in that the means for configuring said watermark in the form of a matrix of size M*M, the calculation means for calculating the coefficients of the Fourier transform matrix of the watermark, the calculation means for calculating the inverse transform of the multiplication and the watermark detection means are realized within a same portion of said circuit including furthermore the internal memory and storage means for storing the coefficients of the watermark as well as the matrices resulting from the configuration step and calculation step of the coefficients of the Fourier transform matrix of the watermark.

8. A circuit as claimed in claim 5, characterized in that the calculation means for calculating the inverse transform of the multiplication include sub-means activated in each sequence for:
  reading the coefficients of the transform matrix of the signal row by row via access to a memory called external memory where they have been stored,
  combining the multiplication of the row read from the external memory and the transform matrix of the watermark with the calculation of a number I situated between one and M/2, of the coefficients of the horizontal inverse transform of the row, said combination being sequentially made of all the rows to obtain for each sequence a set of I coefficient columns which is the result of the horizontal inverse transform of the multiplication of the two matrices,
  calculating for each sequence the vertical inverse Fourier transform of the M coefficients present in the I coefficient columns which is the result of the horizontal inverse transform.

9. A circuit as claimed in claim 5, characterized in that the internal memory has a size strictly smaller than M*M.

10. An information signal processing device, characterized in that it includes an integrated circuit as claimed in claim 5.

* * * * *